(12) United States Patent
Bodziony et al.

(10) Patent No.: US 11,487,776 B2
(45) Date of Patent: Nov. 1, 2022

(54) MANAGING EXTRACT-TRANSFORM-LOAD OPERATIONS

(71) Applicant: International Business Machines Corporation, Armonk, NY (US)

(72) Inventors: Michal Bodziony, Tegoborze (PL); Lukasz Stanislaw Studzienny, Cracow (PL); Andrzej Laskawiec, Cracow (PL); Monika Piatek, Cracow (PL); Marcin Luczynski, Cracow (PL); Marcin Filip, Cracow (PL); Tomasz Zatorski, Cracow (PL)

(73) Assignee: International Business Machines Corporation, Armonk, NY (US)

(*) Notice: Subject to any disclaimer, the term of this patent is extended or adjusted under 35 U.S.C. 154(b) by 351 days.

(21) Appl. No.: 16/801,201

(22) Filed: Feb. 26, 2020

(65) Prior Publication Data
US 2021/0263944 A1   Aug. 26, 2021

(51) Int. Cl.
| | | |
|---|---|---|
| G06F 7/00 | (2006.01) | |
| G06F 17/00 | (2019.01) | |
| G06F 16/25 | (2019.01) | |
| G06F 16/23 | (2019.01) | |
| G06F 9/455 | (2018.01) | |

(52) U.S. Cl.
CPC ........ *G06F 16/254* (2019.01); *G06F 9/45558* (2013.01); *G06F 16/2358* (2019.01); *G06F 2009/4557* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 2011/0055147 A1* | 3/2011 | Joerg | .................... | G06F 9/4843 707/602 |
| 2012/0102007 A1* | 4/2012 | Ramasubramanian | ..................... | G06F 16/254 707/705 |

(Continued)

FOREIGN PATENT DOCUMENTS

| | | |
|---|---|---|
| CN | 101533417 A | 9/2009 |
| CN | 103034554 A | 4/2013 |

(Continued)

OTHER PUBLICATIONS

Radzik, Irem, "The Inevitable Evolution from Batch ETL to Real-Time ETL", Striim Blog, Nov. 5, 2018, 3 pages, Part 1 of 2, <https://www.striim.com/blog/2018/11/evolution-from-batch-etl-to-real-time-etl/>.

*Primary Examiner* — Tuan A Pham
(74) *Attorney, Agent, or Firm* — David K. Mattheis; Maeve Carpenter

(57) ABSTRACT

Managing ETL (extract-transform-load) operation execution by receiving an updated ETL (extract-transform-load) job flow, determining affected stages of a current ETL job flow, sending a message to stop data flow for all stages of the current ETL job flow, sending a switch message along the current ETL job flow through the affected stages, receiving notice of receipt of the switch message downstream from the affected stages of the current ETL job flow, moving an affected stage of the current ETL job flow from a first ETL section to a second ETL section; and resuming data flow according to the updated ETL job flow.

17 Claims, 5 Drawing Sheets

(56) References Cited

U.S. PATENT DOCUMENTS

2015/0134795 A1\* 5/2015 Theimer ............... G06F 16/254
709/223
2020/0004863 A1\* 1/2020 Kumar ................ G06F 11/3452

FOREIGN PATENT DOCUMENTS

CN 104252381 A 12/2014
CN 105868190 B 8/2019

\* cited by examiner

MANAGING EXTRACT-TRANSFORM-LOAD OPERATIONS

BACKGROUND

The disclosure relates generally to managing computing resources for extract-transform-load (ETL) execution. The disclosure relates particularly to the management of ETL operations across resources by implementing new ETL flows as needed.

Extract-transform-load (ETL) jobs are used to move data present in distributed file systems, such as HADOOP Distributed File System (HDFS) files, into database tables where the data can be searched using software such as the APACHE HIVE project. An ETL job is a set of stages that are responsible for different types of activities—reading data, writing data, transforming data, passing data and many others. An ETL job includes stages connected by links. A stage is some kind of action executed upon data, for instance—read from source, write into target, filter data, merge data or some other data transformation. A link is a representation of data flow from one stage to another. The stages may be executed on the same virtual machine (VM), different VMs, or even in multiple Clouds. For instance, reading from one database on one system, reading from another database located somewhere else, writing into HDFS of Hadoop deployed in a different cloud environment.

ETL engines carry responsibility for the execution of ETL job tasks. A single ETL job arrayed across multiple VMs or clouds includes multiple ETL engines, one engine per ETL job section, VM or cloud environment. ETL engines communicate to job stages or nodes by internode communication links.

(Note: the terms "HADOOP", "APACHE", "KAFKA", and "HIVE" may be subject to trademark rights in various jurisdictions throughout the world and are used here only in reference to the products or services properly denominated by the marks to the extent that such trademark rights may exist.).

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the management and optimization of ETL jobs across network resources by implementing new ETL flows as appropriate.

Aspects of the invention disclose methods, systems and computer readable media associated with managing ETL (extract-transform-load) operation execution by receiving an updated ETL (extract-transform-load) job flow, determining affected stages of a current ETL job flow, sending a message to stop data flow for all stages of the current ETL job flow, sending a switch message along the current ETL job flow through the affected stages, receiving notice of receipt of the switch message downstream from the affected stages of the current ETL job flow, moving an affected stage of the current ETL job flow from one side of a remote stage to another side of the remote stage, and resuming data flow according to the updated ETL job flow.

Aspects of the invention disclose methods, systems and computer readable media associated with managing ETL (extract-transform-load) operation execution by receiving an updated ETL (extract-transform-load) job flow, determining affected stages of a current ETL job flow, sending a message to stop data flow for all stages of the current ETL job flow, sending a switch message along the current ETL job flow through the affected stages, receiving notice of receipt of the switch message downstream from the affected stages of the current ETL job flow, moving an affected stage of the current ETL job flow from one side of a remote stage to another side of the remote stage, and resuming data flow according to the updated ETL job flow. Further, identifying a first section of the first ETL flow for replacement, instantiating a new section according to the optimized ETL flow, ceasing data flow through the section, sending a switch message through the old section of the first ETL flow, notice that the switch message has passed through the old section of the first ETL flow, and replacing the old section of the first ETL flow with the new section.

Aspects of the invention disclose methods, systems and computer readable media associated with managing ETL (extract-transform-load) operation execution by receiving an updated ETL (extract-transform-load) job flow, determining affected stages of a current ETL job flow, sending a message to stop data flow for all stages of the current ETL job flow, sending a switch message along the current ETL job flow through the affected stages, receiving notice of receipt of the switch message downstream from the affected stages of the current ETL job flow, moving an affected stage of the current ETL job flow from one side of a remote stage to another side of the remote stage, and resuming data flow according to the updated ETL job flow. Further, by sending, by a first ETL flow stage, a switch message along the first ETL flow, stopping data flow from all current ETL flow stages, receiving notice of receipt of the switch message at a first ETL flow destination stage, constructing a new ETL flow, and starting data flow in the new ETL flow.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
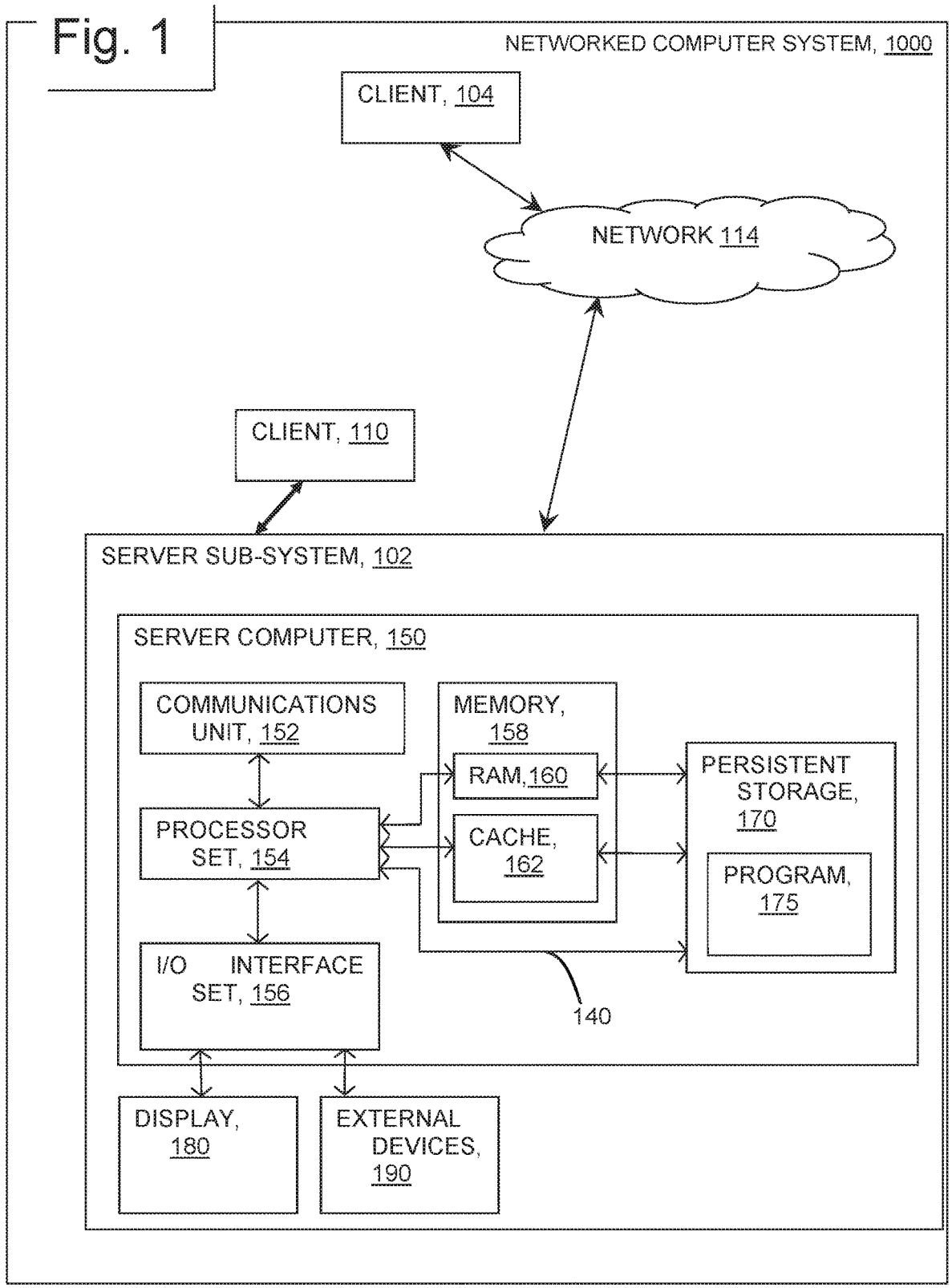
FIG. 1 provides a schematic illustration of a system, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., initiating and implementing new ETL flows, etc.). These solutions are not abstract and cannot be performed as a set of mental acts by a human due to the processing capabilities needed to facilitate ETL job flow management, for example. Further, some of the processes performed may be performed by a specialized computer for carrying out defined tasks related to memory operations. For example, a specialized computer can be employed to carry out tasks related to managing ETL flows or the like.

Multiple clouds are becoming an integral part of the computational resource picture. The complexity of possible interactions and relations across the computational resource increases. Due to the complexity, the results of any upfront optimization of ETL jobs rarely fall into even suboptimal solution over job's life span. The jobs may be running for days or weeks. Conditions within computing environments may change in time, and data that is processed may bring new insights into its content. The initial constraints used for an ETL computing job's design may become completely different. These new constraints serve as inputs for defining new ETL job flows. Increased executions time, where jobs operate without interruptions, dynamically changed environmental conditions and multilayered, broad cloud approaches, bring new challenge where optimizing the performance of ETL jobs becomes dependent upon constant changes in the computing ecosystem. The disclosed embodiments provide methods for changing from a first ETL job flow to a second ETL job flow, at runtime, and without data loss, or any need to resend data.

In an embodiment, a system needs to change from a first or current ETL flow to a second, updated ETL flow. In this embodiment, the execution of the stages of the first and second ETL job flows occurs in different sections of an overall computing environment. The different sections can be portions of a single virtual machine, different virtual machines and even different cloud computing environments. Links connecting ETL job stages extend between sections as needed. Virtual, remote stages define the links connecting one section to the next. In one aspect, the remote stages serve as data pipeline junctions between sections. Each remote stage has a defined data source in an upstream section, and a defined data destination in a downstream section. The nature of the remotes stage (pipeline) varies according to the sections connected. VM system pipes connect sections sharing a common VM. TCP/IP pipes connect sections on a common network with differing operating systems. APACHE KAFKA queues, or other queues, connect sections located in differing cloud environments.

The need for the change from the first to the second ETL job flow arises externally to the methods of the invention. Automated, or manual evaluation of ETL stage performance indicates a benefit from the movement of one or more ETL stages between sections, rearranging the overall ETL data flow. As an example, a first ETL flow includes a two read stages in a first section and a filter stage downstream from one of the read nodes, in a second section. Data filtration occurs after the data flows through a first remote stage connecting the first read stage in the first section to the filter stage of the second ETL section. Data from the second read stage of the first section passes to the second section through a second remote stage and merges with the output of the data filter at a merge stage in the second section.

Evaluation of the filter performance indicates filtering out of 90% of data received from the remote stage. Filtering the data in the first section and only sending the unfiltered 10% across the remote stage improves ETL job performance. Design and instantiation of a new ETL job flow having the filter moved from the second to the first section occurs. The new ETL job flow includes a new section defined by remote stages downstream of the current filter stage location and upstream of the new filter stage location. The new ETL job flow passes to the ETL engines of the first and second sections. The new ETL flow includes movement of the filter stage to the first section and redefines the input and outputs of the remote stages upstream from the new filter stage location and downstream from the old filter stage location.

The ETL engine of the first section receives the updated ETL job flow and sends an internode signal to all first section read nodes to stop sending data to the second section stages. A technical switch message is then sent from the first read node to the remote stage, filter stage, and finally, the merge stage. The merge stage sends a message indicating receipt of the switch message. Possible receipt message recipients include the first section ETL engine, the second section ETL engine, a system workload manager program, and a system balance optimizer of a system information server.

After either receiving the receipt directly, or receiving notice of the receipt, the first and second section ETL engines implement the instantiated updated ETL flow, effectively moving the filter stage from the second section to the first section. The first section ETL engine redefines the upstream remote stage between sections and connects the new filter stage between the first read stage and the first remote stage, and the second section ETL engine redefines the downstream remote stage and connects the remote stage output to the merge stage, effectively moving the filter stage from the second to the first section and establishing the updated ETL flow. The first section ETL engine sends a message to all first section read stages to resume sending data to the second section after the movement of affected filter stage and the definition of new remote stage connections are completed.

In an embodiment, after receiving the updated ETL job flow, the first section ETL engine sends messages stopping all data flow to the second section except data flowing to the affected stage—the second section filter stage of the example. In this embodiment, a switch message is then sent along the data path of the affected stage indicating the end of data flowing along the path before changing from the old ETL flow to the new ETL flow. After the switch message has been received downstream from the remote stage connecting the old section of the current ETL flow with the downstream section, a receipt notice is sent to the management program 175 and all relevant ETL engines. New sections are implemented resulting in the movement of affected stages between old and new ETL job flow sections, the filter stage is moved from a downstream section to an upstream section of the ETL flow. Remote stage connections upstream and downstream of the revised section are redefined to enable data flow to the relocated filter stage After affected stages are moved and the remote stage connections are redefined, data flow between the sections resumes under the direction of the management program 175 and the first section ETL engine.

In an embodiment, the method moves the affected stage from a first section on a first virtual machine to a second section on a second virtual machine. In an embodiment, the method moves an affected stage from a first section on a first cloud resource to a second section on a second cloud resource. Movement of the affected stage between sections may be upstream or downstream. Movement of multiple affected stages may occur when transitioning between a current and updated ETL job flow. In an embodiment, affected stages within a single section are rearranged and no movement across section boundaries occurs. In this embodiment, redefined upstream and downstream remote stage connections of the section alter the flow of data across the rearranged section stages.

In an embodiment, the stages and links of the current and updated ETL job flows are considered as non-cyclic graphs (sets of vertices (stages) connected by edges (links)). In this embodiment, the method analyzes the pair of sets to determine which stages will move in creating the new ETL job flow. Beginning at each data source, the sets are reviewed in parallel until differences in vertices (stages) are identified along the flow. The method identifies the edge (link) between the last upstream common vertex and first new vertex as the upstream remote stage where data flow will stop and then resume after implementing the new ETL. These upstream remote stages define the upstream edge of the old and new subgraphs used by the method. The method identifies the link between the last differing vertex and first common downstream vertex as the first downstream remote stage defining the downstream edge of the old and new subgraphs used by the method.

In an embodiment, the method reviews the entire combination of the current and updated ETL flows to identify an old subgraph section of the current ETL to be replaced by a new subgraph section of the updated ETL. In this embodiment, the upstream and downstream links of the old subgraph are identified as the remote stages which will be stopped, redefined and restarted during the transition. The method identifies the vertices of the old subgraph as those stages affected by the update and the vertices of the new subgraph as the locations of the affected stages in the new ETL flow. In this embodiment, instructions are sent to the affected ETL engines regarding the switch message addressing and content for the affected stages and the stages relevant to stopping data flow, the location of stages of the new subgraph to be instantiated after notice of receipt of the switch message occurs, and the new remote stage connections for the new subgraph. The method then proceeds by stopping data flow on all non-affected paths, sending the switch message over all affected paths, receiving notice that the switch message has cleared the affected paths, establishing the new subgraph including new stage locations and new remote stage connections for the upstream and downstream subgraph edge remote stages, and starting the flow of ETL data through the new ETL job flow.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise ETL management program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the ETL management program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., ETL management program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
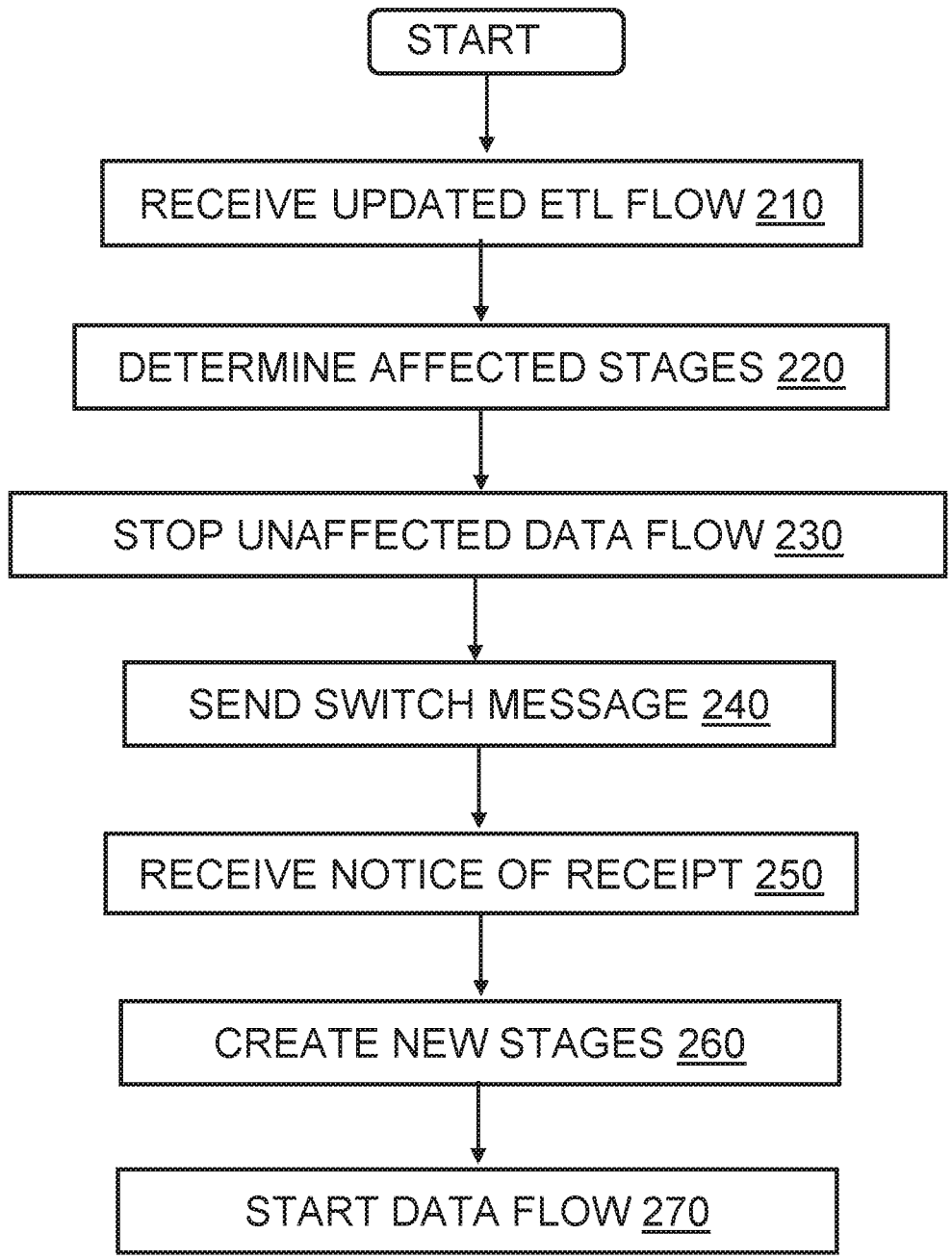
FIG. 2 provides a flowchart depicting an operational sequence, according to an embodiment of the invention.

FIG. 2 provides a flowchart 200, illustrating exemplary activities associated with the practice of the disclosure. After program start, ETL management program 175 receives an updated ETL job flow at block 210. The updated ETL job flow includes new ETL stage locations in the sections of the current ETL. Some or all sections of the current ETL job flow may be altered in the new ETL job flow. ETL management program 175 determines affected ETL stages of current ETL job flow at block 220. In an embodiment, affected stages are determined by comparing representations of the current and updated ETL flows. Affected stages define an old ETL flow subgraph and the updated version of the affected stages' location defines a new ETL subgraph. The upstream and downstream boundaries of the old and new subgraphs are defined by remote stages. At block 230, ETL managing program 175 sends technical messages to unaffected data source stages upstream of the upstream remote stages of the old subgraph of the current ETL flow, ceasing the flow of data from those data source stages. At block 240, the program sends a switch message from the data source stage upstream from the remote stage of each affected old subgraph stage. The switch message stops data flow from the upstream data source stage and proceeds along the affected ETL data path. At block 250, the program receives notice of receipt of the switch message from the first stage downstream from the old subgraph remote stage along the affected path. All affected section ETL engines receive notice of the receipt. At block 260, the affected section ETL engines create and implements the stages of the new subgraph and define new connections of the remotes stages upstream and downstream of the old subgraph for the new subgraph. At block 270, data flow resumes, passing through the new remote stage connections and the relocated ETL flow stages of the updated ETL flow.

Figure 3:
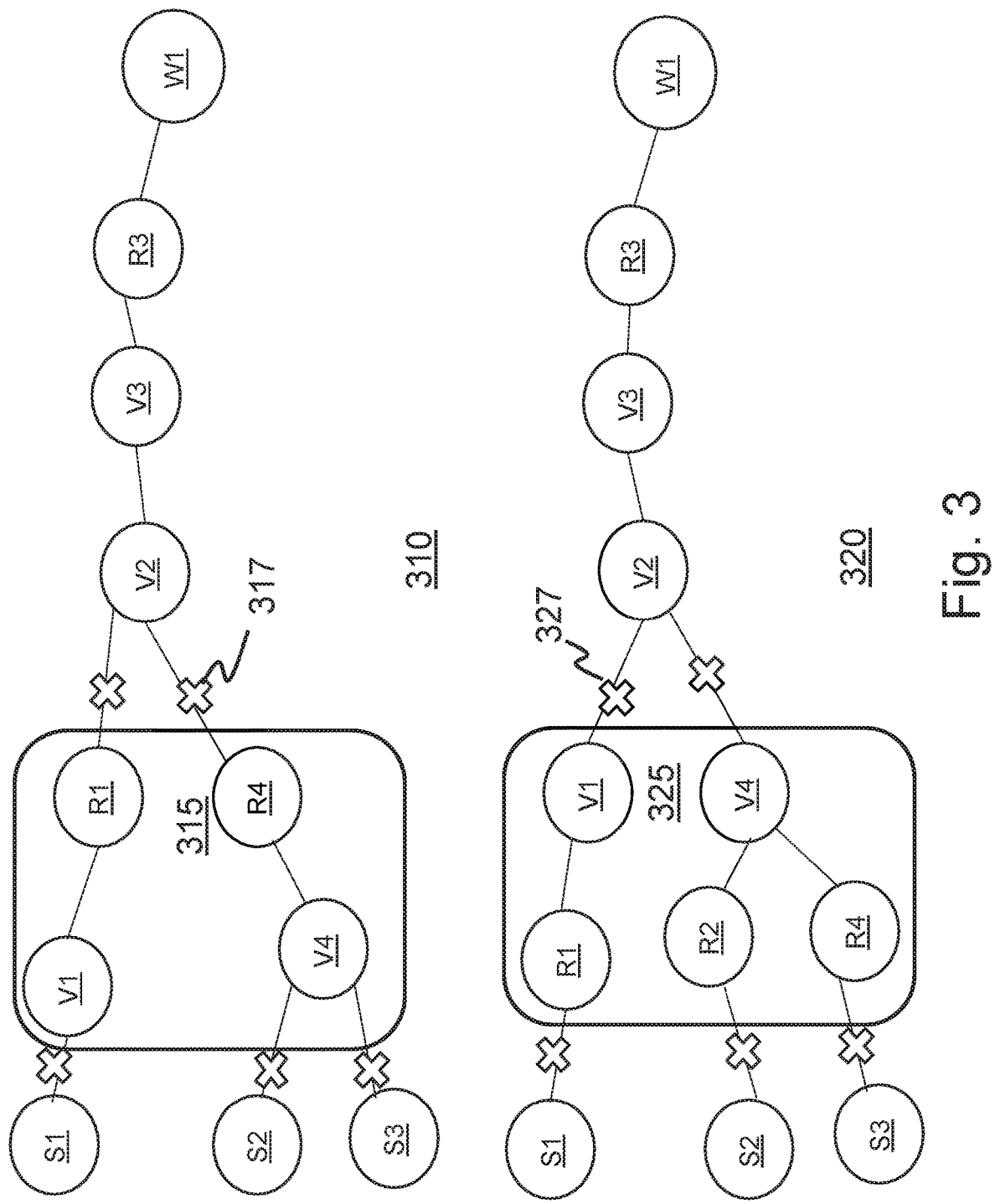
FIG. 3 provides a graphic depiction of ETL job stages managed according to an embodiment of the invention.

FIG. 3 illustrates exemplary graphs of current 310, and updated 320, ETL job flows analyzed by the method of an embodiment of the invention to determine which stages of the current ETL job flow 310 are affected by the external optimization process—to identify the old 315 and new 325, ETL job subgraphs. Each of graphs 310 and 320 includes vertices S1-S3, R1-R4, V1-V4, and W1. Determination of affected stages begins by comparing the two graphs. Starting at each of S1, S2, and S3, the method of ETL management program 175 identifies the S1-V1 transition as different from S1-R1 transition, as well as S2-V4, S3-V4, differing from S2-R2, S3-R4. The method notes that all transition differences cease at the transition to V2. Old subgraph 315 will be replaced with new subgraph 325 according to the steps of the method set forth above for stopping data flow, creating new stages as needed, and starting data flow through the new stages. "X" markings 317 represent the remotes stages connecting old subgraph 315 to current ETL flow 310. Redefined remote stages 327 connect new subgraph 325 to updated ETL flow 320 using data paths defined according to the new subgraph 325.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
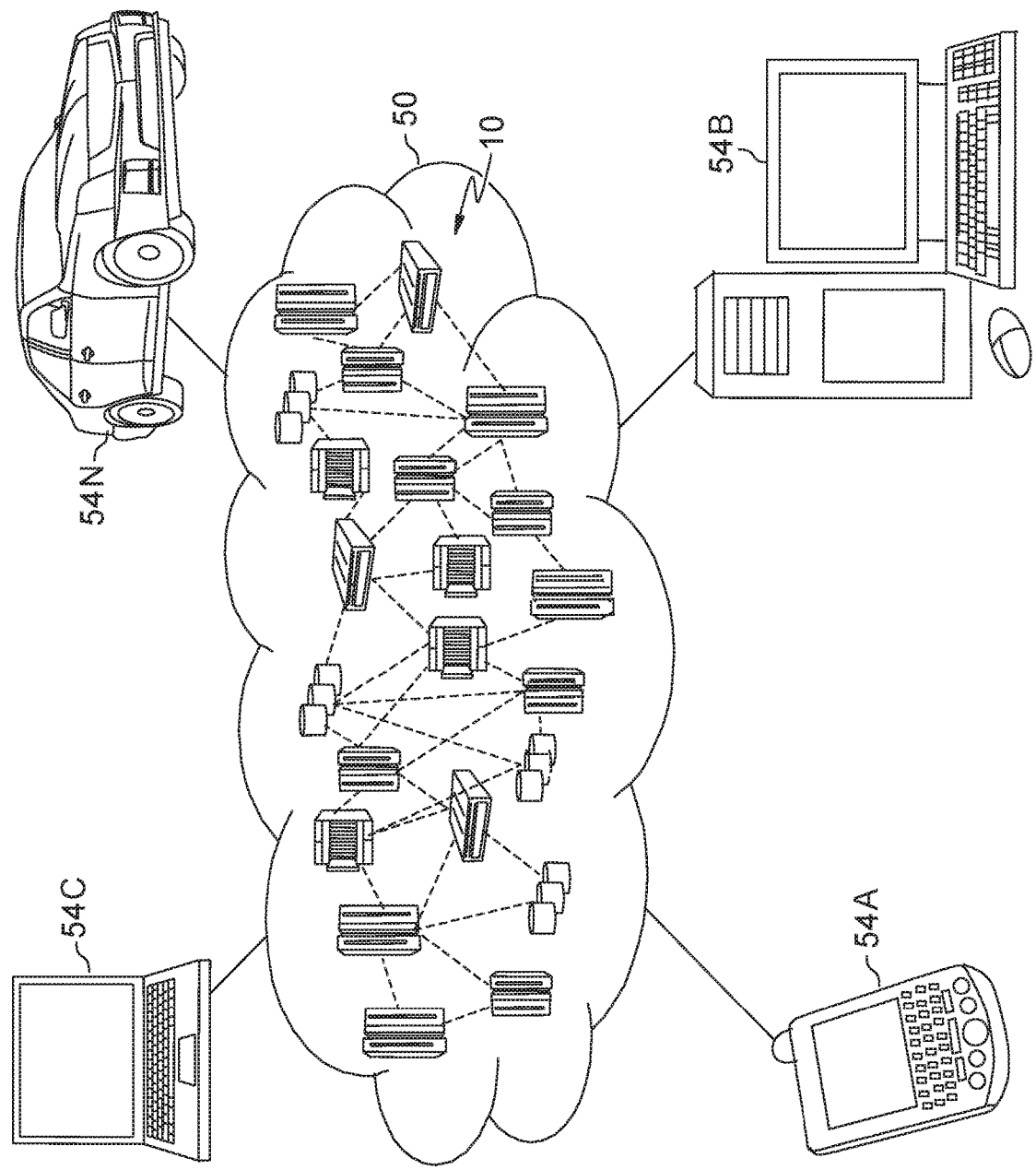
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
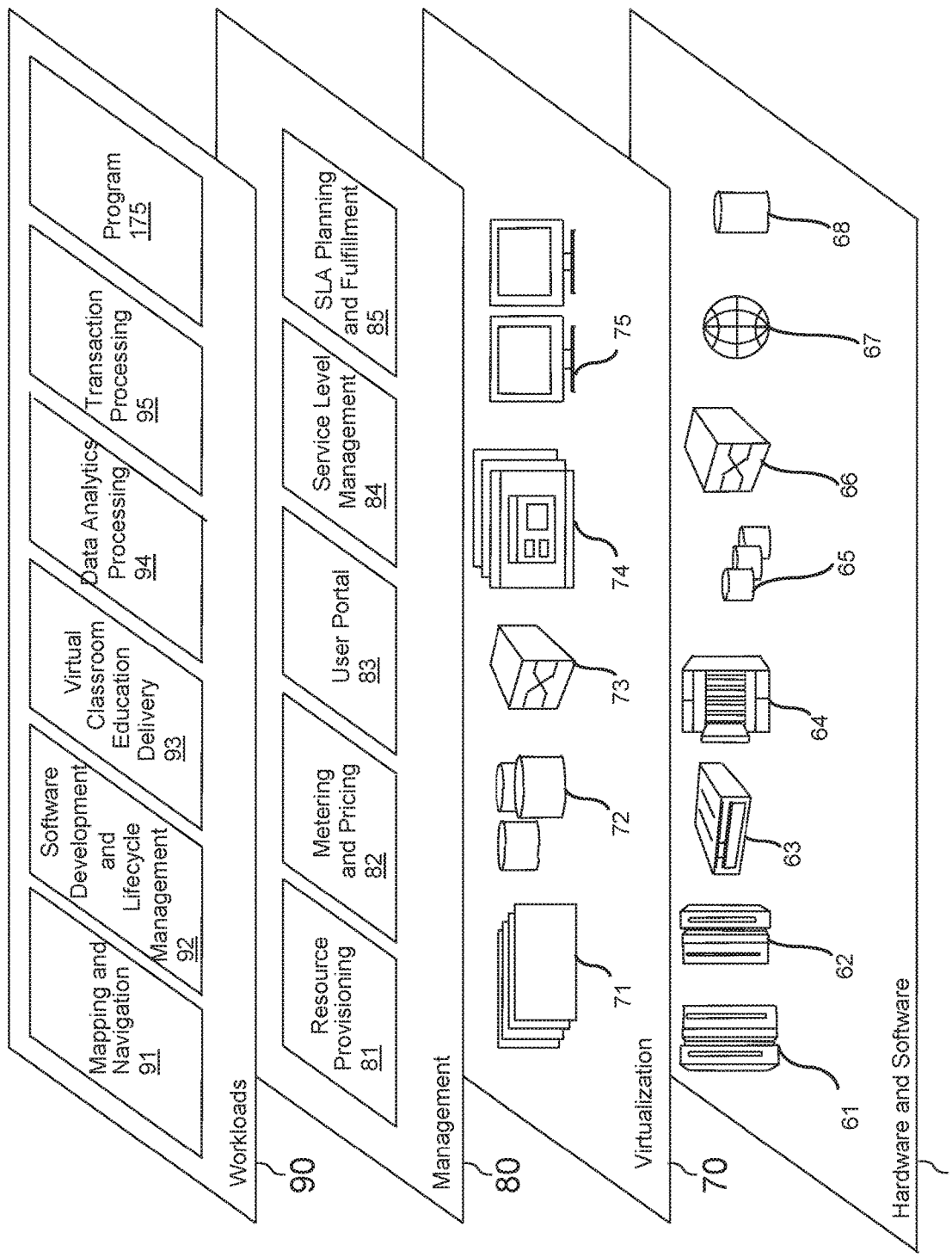
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ETL management program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing ETL (extract-transform-load) operation execution, the method comprising:

receiving an updated ETL (extract-transform-load) job flow;
identifying a first section of the current ETL flow for replacement;
instantiating a second section according to the updated ETL flow;
ceasing data flow through the first section;
sending a switch message through the first section of the first ETL flow;
receiving notice that the switch message has passed through the first section of the first ETL flow;
replacing the first section of the first ETL flow with the second section;
determining stages of a current ETL job flow affected by the updated ETL job flow;
sending a message to stop data flow for all stages of the current ETL job flow unaffected by the updated ETL job flow;
sending a switch message along the current ETL job flow through the stages affected by the updated ETL job flow;
receiving notice of receipt of the switch message downstream from the stages of the current ETL job flow affected by the updated ETL job flow;
moving a stage of the current ETL job flow, affected by the updated ETL job flow, from one side of a remote stage to another side of the remote stage; and
resuming data flow according to the updated ETL job flow.

2. The method of claim 1, wherein moving an affected stage includes moving to a new virtual machine.

3. The method of claim 1, wherein moving an affected stage includes moving to a new cloud environment.

4. The method of claim 1, wherein the current and updated ETL flows are embodied in non-cyclic graphs.

5. The method according to claim 1, further comprising:
stopping data flow from all other first ETL flow stages;
sending, by a first ETL flow stage, a switch message along the first ETL flow;
receiving notice of receipt of the switch message at a first ETL flow destination stage;
constructing a new ETL flow; and
starting data flow in the new ETL flow.

6. The method according to claim 1, wherein moving the affected stage of the current ETL job flow from a first ETL section to a second ETL section, comprises moving the affected stage upstream.

7. A computer program product for managing ETL (extract-transform-load) operation execution, the computer program product comprising one or more computer readable storage devices and program instructions collectively stored on the one or more computer readable storage devices, the stored program instructions comprising:
program instructions to receive an updated ETL (extract-transform-load) job flow;
program instructions to identify a first section of the current ETL flow for replacement;
program instructions to instantiate a second section according to the updated ETL flow;
program instructions to cease data flow through the first section;
program instructions to send a switch message through the first section of the first ETL flow;
program instructions to receive notice that the switch message has passed through the first section of the first ETL flow;
program instructions to replace the first section of the first ETL flow with the second section
program instructions to determine stages of a current ETL job flow affected by the updated ETL job flow;
program instructions to send a message to stop data flow for all stages of the current ETL job flow unaffected by the updated ETL job flow;
program instructions to send a switch message along the current ETL job flow through the stages affected by the updated ETL job flow;
program instructions to receive notice of receipt of the switch message downstream from the stages of the current ETL job flow affected by the updated ETL job flow;
program instructions to move a stage of the current ETL job flow affected by the updated ETL job flow, from one side of a remote stage to another side of the remote stage; and
program instructions to resume data flow according to the updated ETL job flow.

8. The computer program product according to claim 7, wherein moving an affected stage comprises moving to a new virtual machine.

9. The computer program product according to claim 7, wherein moving the affected stage comprises moving to a new cloud environment.

10. The computer program product according to claim 7, wherein the current and updated ETL flows are embodied in non-cyclic graphs.

11. The computer program product according to claim 7, the stored program instructions further comprising:
program instructions to stop data flow from all other first ETL flow stages;
program instructions to send, by a first ETL flow stage, a switch message along the first ETL flow;
program instructions to receive notice of receipt of the switch message at a first ETL flow destination stage;
program instructions to construct a new ETL flow; and
program instructions to start data flow in the new ETL flow.

12. The computer program product according to claim 7, wherein moving the affected stage of the current ETL job flow from a first ETL section to a second ETL section, comprises moving the affected stage upstream.

13. A computer system for managing ETL (extract-transform-load) operation execution, the computer system comprising:
one or more computer processors;
one or more computer readable storage devices; and
stored program instructions on the one or more computer readable storage devices for execution by the one or more computer processors, the stored program instructions comprising:
program instructions to receive an updated ETL (extract-transform-load) job flow;
program instructions to identify a first section of the current ETL flow for replacement;
program instructions to instantiate a second section according to the updated ETL flow;
program instructions to cease data flow through the first section;
program instructions to send a switch message through the first section of the first ETL flow;
program instructions to receive notice that the switch message has passed through the first section of the first ETL flow; and program instructions to replace the first section of the first ETL flow with the second section program instructions to determine stages of a current ETL job flow affected by the updated ETL job flow;

program instructions to send a message to stop data flow for all stages of the current ETL job flow unaffected by the updated ETL job flow;

program instructions to send a switch message along the current ETL job flow through the stages affected by the updated ETL job flow;

program instructions to receive notice of receipt of the switch message downstream from the stages of the current ETL job flow affected by the updated ETL job flow;

program instructions to move a stage of the current ETL job flow affected by the updated ETL job flow, from one side of a remote stage to another side of the remote stage; and program instructions to resume data flow according to the updated ETL job flow.

14. The computer system according to claim 13, wherein moving an affected stage comprises moving to a new virtual machine.

15. The computer system according to claim 13, wherein moving the affected stage comprises moving to a new cloud environment.

16. The computer system according to claim 13, wherein the current and updated ETL flows are embodied in non-cyclic graphs.

17. The computer system according to claim 13, the stored program instructions further comprising:

program instructions to stop data flow from all other first ETL flow stages;

program instructions to send, by a first ETL flow stage, a switch message along the first ETL flow;

program instructions to receive notice of receipt of the switch message at a first ETL flow destination stage;

program instructions to construct a new ETL flow; and program instructions to start data flow in the new ETL flow.

* * * * *